April 28, 1953  E. SCHWARZ  2,636,855
METHOD OF PRODUCING PHOTOCONDUCTIVE COATINGS
Filed Oct. 18, 1948  2 SHEETS—SHEET 1

Inventor:
Ernst Schwarz;
By his attorneys
Baldwin, Wight, & Brevost

April 28, 1953 E. SCHWARZ 2,636,855
METHOD OF PRODUCING PHOTOCONDUCTIVE COATINGS
Filed Oct. 18, 1948 2 SHEETS—SHEET 2
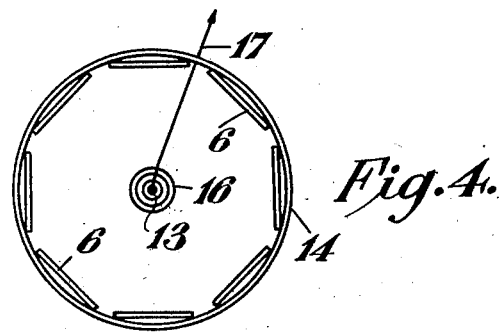
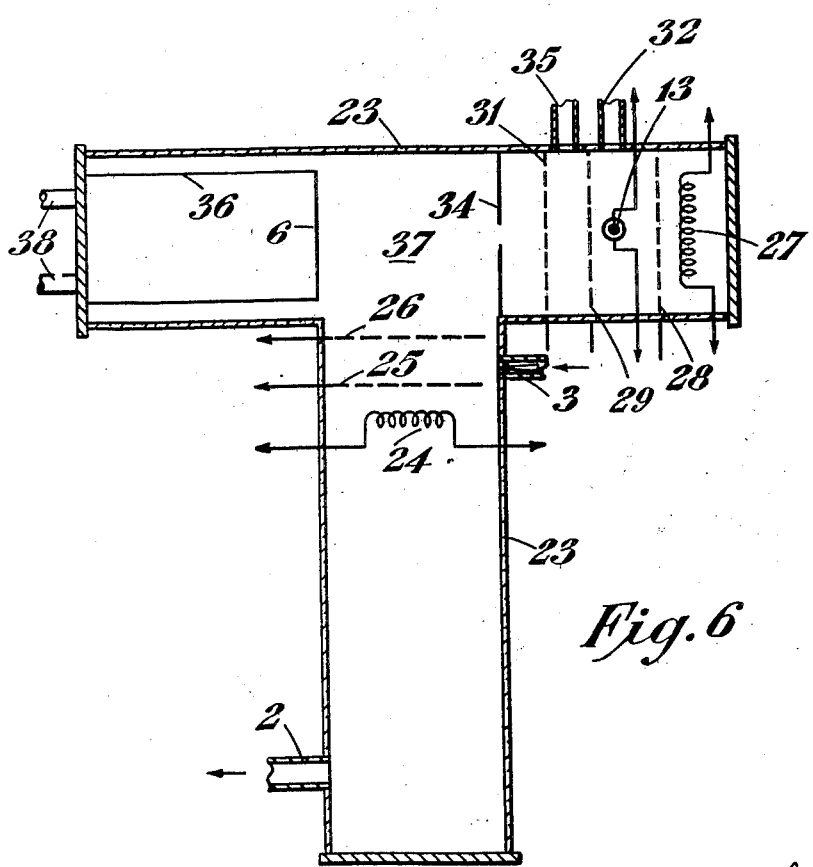
Inventor:
Ernst Schwarz;
By his attorneys,
Baldwin, Wight, & Prevost Patented Apr. 28, 1953

2,636,855

UNITED STATES PATENT OFFICE 2,636,855

METHOD OF PRODUCING PHOTO-CONDUCTIVE COATINGS

Ernst Schwarz, London, England, assignor to Hilger & Watts, Limited, London, England, a company of Great Britain Application October 18, 1948, Serial No. 55,216
In Great Britain March 25, 1948

4 Claims. (Cl. 204—192)

The invention relates to photocells of the kind in which the impact of photons on sensitive material gives rise to the release of electrons in greater number than the incoming photons, which then take part in increased conduction of electricity. Such cells, known as photo-conductive cells, are already known. The first to be produced was the selenium cell, but other materials have also been proposed, such as thallium sulphide, lead sulphide, lead selenide and lead telluride.

Photocells utilizing the compounds named are sometimes produced by vaporizing the substance in a high vacuum or in an atmosphere of oxygen at sub-atmospheric pressure. They may also be produced by a wet process, the substance being precipitated by chemical reaction. It appears that oxygen is essential for the high sensitivity of all these cells. Often it is necessary after the deposition of the layer to apply a heat treatment in oxygen.

The invention is directed more particularly to making provision for oxygen or some other gas having a like effect to be more readily taken up than hitherto during the process of evaporation. As a result the properties of photocells of the known substances are improved and many new substances have been found suitable for use, giving a wider selection of the ranges of spectral sensitivity for specific purposes.

It is an object of the invention to vaporize the substance destined to form the sensitive layer for deposition on to a support or carrier and to subject the said substance while in the vapor phase to an electric discharge in the presence of oxygen or air.

The inventor has carried out many experiments with different semi-conductors to ascertain whether they were suitable for the production of photo-conductive cells and to find out what conditions must be observed in the production. These experiments have led to the formulation of a theory which will account for the mechanism of photo-conduction, and, though the correctness of the theory is not of the essence of the invention, it has proved a useful guide in determining the probable photo-conductive properties of various substances and in indicating suitable methods of preparing photocells therefrom.

The experiments referred to suggested that the particular action of oxygen can be best accounted for if it is assumed that the oxygen is adsorbed on the semi-conductor and is not taken up by the lattice or only as a secondary process.

It is known that adsorption of gases on finely divided metals is much enhanced if an electric discharge is passed through the vessel containing the adsorbent.

According to the theory now propounded each particle on its way to the carrier adsorbs oxygen under the influence of the electric discharge and when deposited is surrounded by an insulating layer of oxygen ions, which prevents close contact with the neighboring particles. The barrier layer thus formed accounts for the high resistance of the deposited substance in its normal condition and for the negative temperature coefficient of resistance. Radiation falling on the substance opens up the barrier layer and thus increases the conductivity.

From the experiments performed it was possible to formulate general rules which substances must fulfil for the production of a sensitive photocell. The first condition is that the temperature coefficient of resistance is negative, and that depends on the amount of oxygen which the substance can adsorb while in the vapor phase on its way from the source to the carrier. The amount of adsorbed gas is determined by the forces between the particles of the substance and the gas particles, by the gas pressure and by the length of the path the evaporated particle travels before it reaches the carrier. The forces between the particles are regulated by the electrical conditions of the discharge; and the path length and gas pressure must be properly adjusted to achieve a negative temperature coefficient.

The second condition which must be fulfilled is that the substance can be deposited on the carrier without substantial chemical change. If the substance is a compound this means in most cases that it is not appreciably dissociated at a temperature at which the vapor pressure of the compound is high enough to produce a layer of sufficient thickness in reasonable time. Nevertheless certain compounds which dissociate at the required temperature can be used by depositing the constituents in sequence. Compounds which dissociate thus and have been investigated include a metal. The metal should be vaporized and deposited first and thereafter the other constituent, which may be a metalloid. This condition rules out compounds of which the metallic constituent would be heavily oxidized under the conditions of deposition.

The third condition for the production of sensitive cells is given by the electrical conductivity of the pure substance, i. e., of the pure substance in bulk or the substance when evaporated in a high vacuum where no oxygen or other gas can be adsorbed to form a barrier layer. As the sensitivity of the cell is determined by the ratio of the conductivity of the substance with and without the barrier layer, it will be higher, other things being equal, the greater is the bulk conductivity of the substance.

The fourth condition which a substance must fulfil to give a highly sensitive cell is that the forces of adsorption between the substance and the oxygen are stronger than the bond between the particles themselves. This condition needs some explanation.

After the deposition of the evaporated particles the layer has to be heated in oxygen or air to achieve optimum sensitivity. During this treatment more oxygen is in general adsorbed on the boundaries between adjacent particles, the barrier layer thickness increases and with it the photo-sensitivity. It may occur with certain substances that this heat treatment leads to a change in the temperature coefficient of resistance to positive values and to much reduced resistance. In such a case the photo-conductivity is completely lost, and no further treatment will restore the sensitivity. In which direction the process goes will depend on the relative strength of the bond between the substance and the oxygen on the one hand and the bond between the particles on the other hand.

Methods of carrying out the process of the invention are illustrated in the accompanying drawings, which show diagrammatically arrangements of apparatus for different methods, and therein Fig. 1 shows the method of cathode sputtering in elevation;

Fig. 4 is a plan of the same with the enclosing vessel removed;

Fig. 6 shows in elevation the method of separate production of ions.

Figure 1:
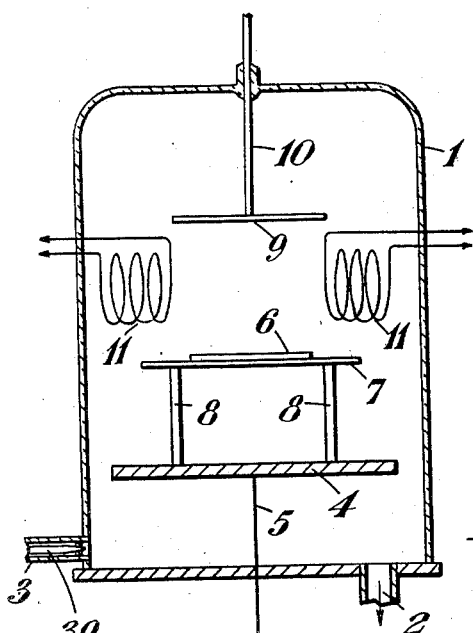

Referring to Fig. 1, the process of cathode sputtering is carried out in an air-tight vessel 1 having a connection 2 to a vacuum pump and a connection 3 for supplying the gas in which the process is to be carried out. The air is first exhausted from the vessel 1, and the gas is then admitted. This gas may be oxygen or air. The pressure can be adjusted by means of an inlet needle valve 39. The optimum pressure varies according to the substance being deposited, and on account of the wide variety of substances available must be found in each case by experiment.

A table 4 is supported on an insulated conductive stem 5 to form the anode, and the carrier 6 for the photo-sensitive layer is placed on a second table 7 spaced at a suitable distance from the first table 4 by insulating legs 8. The carrier could alternatively be placed direct on the table 4 by omitting the second table 7 and legs 8.

A cathode 9 in the form of a disc 2 to 5 cm. in diameter is made of the substance of which the sensitive layer is to be formed and is supported on an insulated conductive rod 10.

For carrying out the sputtering a D. C. voltage of about 3,000 is applied between the conductors 5 and 10, the latter being negative. A high current density is favorable for production, and to prevent the bombarding electrons from overheating the layer of substance deposited on the carrier 6, these electrons are deflected by a magnetic or electric field. Coils 11 are shown in the figure to produce a magnetic field. The particles of material passing from the cathode 9 to the carrier 6 are only deflected very slightly by the field on account of their much greater mass in relation to their charge.

The carrier 6 should in any case be placed outside the dark space of the discharge and should preferably be at a great distance from the cathode 9. The carrier may be heated or cooled by appropriate means to any desired temperature during or after the sputtering. In this way any treatment of the deposit can be carried out either in the same gas or, if undertaken subsequently, in some other gas.

Figure 2:
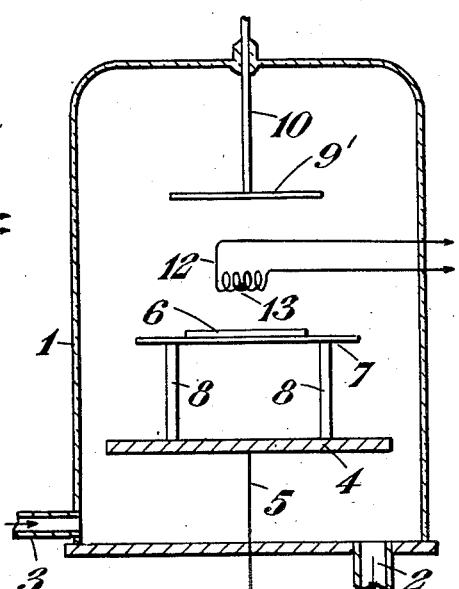
Fig. 2 shows the method of evaporation in a gas discharge in elevation.

There are cases in which cathode sputtering is difficult to carry out. For instance it may not be convenient to make a cathode of sufficiently large diameter, or at the optimum gas pressure the cathode may oxidize so extensively that the sputtering is unduly retarded or completely stopped. A second method may be adopted in such cases, namely evaporation in a gas discharge, as shown in Fig. 2.

The anode arrangements and enclosure are as described in connection with Fig. 1, but the cathode 9' should be a sheet of aluminum or other metal which does not sputter. In the space between the carrier 6 and cathode 9' a heater coil 12 carries a small amount of the substance 13 to be deposited and is heated to a suitable temperature by an electric current.

In this arrangement the particles of coating substance liberated from the heated coil 12 travel in a space filled with ions of oxygen or other treatment gas and adsorb these ions before arriving at the carrier 6.

An alternative arrangement is to make the cathode of a substance which readily sputters and which will then mix or react with the particles liberated by the coil 12.

Figure 3:
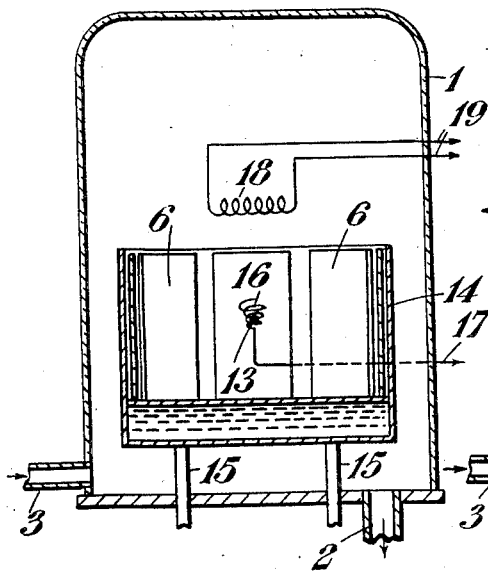
Fig. 3 shows the method of a low voltage arc in elevation.

A very convenient method of producing sensitive layers is by means of a low voltage arc, as shown in Figs. 3 and 4. The enclosure 1 is as before. The carriers 6 are supported vertically in a vessel 14 having a false bottom, through which a cooling fluid is circulated by pipes 15. The coating substance 13 is supported in a small boat 16 of tungsten wire on a supporting wire 17. A coil of wire 18 above the vessel 14 constitutes a source of electrons and is heated by a current at about 12 volts through leads 19. A direct current voltage of about 50 to 220 volts is applied between the wire 17 and one lead 19, the latter being negative. The substance 13 is thereby bombarded by electrons and negative gas ions from the electron source 18, and the heat produced by the bombardment is sufficient to vaporize the substance.

Figure 5:
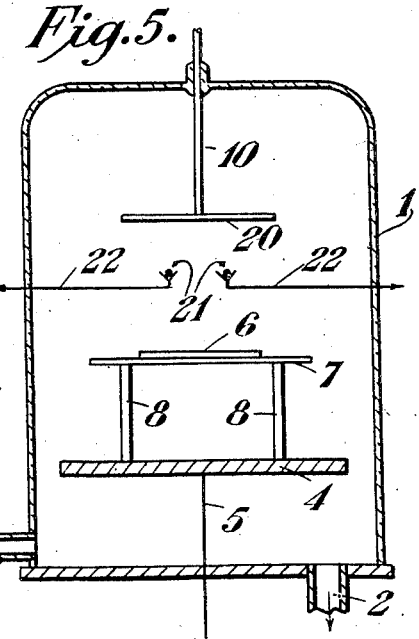
Fig. 5 shows a combination of the last two methods in elevation.

A combination of the first and third methods, viz. cathode sputtering and low voltage arc is shown in Fig. 5. The enclosure 1 and the anode arrangements are as described in connection with Fig. 1. The cathode 20 is placed at a suitable distance from the carrier 6, and a high D. C. voltage, say 3,000 volts, is applied between the cathode 20 and anode 4. Between the cathode 20 and the carrier 6 two cups 21 are spaced apart and have a voltage of about 220 volts A. C. applied between them through leads 22. The substance to be vaporized is placed in the cups 21.

The substance may be the same at both points, or two different substances may be used to mix or react with one another. Under the effect of the gas discharge between the cathode 20 and anode 4, the gas becomes conducting and an arc is struck between the cups 21, which produces sufficient heat to vaporize the substances carried by the points. The cathode may be of some non-sputtering material such as aluminum, or it may on the other hand be made of or coated with one of the substances to be applied to the carrier.

In the arrangements previously described the particles of the substance are produced within the space containing the gas ions. In most cases it is preferred to separate the production of gas ions from the production of ions of the substance to be deposited and to allow them to interact subsequently but before deposition on the carrier. An advantage achieved in this case is the greater facility of control of the conditions of operation.

An arrangement suitable for this method is shown in Fig. 6. The gas-tight enclosure 23 is in this case in the shape of a T, and the description will be given in relation to the conventional position of the letter T, though in practice the vessel 23 will lie in a horizontal position.

The air pump connection 2 is near the foot of the upright stem and the gas inlet connection 3 is near the upper end thereof. A source of electrons 24 is mounted in the stem of the T and is energized at 12 volts A. C. Above the source 24 there is a grid 25 held at a positive voltage in relation to the source 24 and a further grid 26 at a still higher positive voltage. The grids 25 and 26 are so located that the gas stream from the connection 3 enters between them.

In the right hand branch of the T, starting from the right is first a source of electrons 27 similar to the source 24, then a grid 28 maintained positive to accelerate the electrons to the left. The next element is a coil of wire 29 heated at about 6 volts A. C. and containing the coating material 13. Next to the left is a grid 30 held negative in relation to the source 27 to accelerate the positive ions of material 13 released by the electron bombardment. A further grid 31 is held still more negative to accelerate the ions further.

The treatment gas entering at 3 might unduly oxidize the material 13, and it is therefore advisable to produce and accelerate the ions in an inert atmosphere. For this purpose nitrogen or other inert gas is introduced by a connection 32 to impinge on or near to the coil 29. Mixing with the treatment gas is minimized by a diaphragm 33 having a central aperture 34 for the passage of the ions of coating material. The inert gas is kept in constant flow, being removed through a connection 35 between the grids 30 and 31.

The carrier 6 to be coated is located by a support 36 where the left hand branch of the T abuts on the space 37 at the junction of the stem and branches of the T. Cooling means may be incorporated in the support 36 as indicated by the connections 38.

In operation negative gas ions are accelerated by the grid 26 into the space 37, and positive ions of the material to be deposited are accelerated by the grids 30 and 31 into the same space 37. These ions react with each other in the manner already described and are deposited on the carrier 6.

Substances which can be used by the method of the invention to produce photo-conductive cells appear to fall into certain classes, which on account of the nature of metalloids may not be mutually exclusive. Four conditions have been set out above which substances must fulfil to be suitable for the purpose envisaged.

One class which complies with the conditions and therefore consists of substances which can be used for photo-conductive cells is that of binary metallic compounds, that is to say true chemical compounds of one metal with another as distinct from alloys. Suitable substances coming into this class are the antimonides of tin, indium and cadmium and the aluminide of gold.

A second group of substances which fulfil all four conditions directly, including the possibility of deposition as a compound by vaporization without substantial dissociation, is constituted by compounds of the more metallic elements in the B sub-groups of the 2nd, 3rd, 4th and 5th groups of the periodic series with elements of the B sub-group of the 6th group. From the latter category it is necessary to exclude oxygen, because it enters into the process in another manner. Polonium must likewise be excluded as being of no practical interest for the present purpose.

Thus it is possible to produce by the methods described above highly sensitive cells having as active substance one or other of the sulphides, selenides and tellurides of cadmium, indium, thallium, tin, lead, antimony and bismuth.

A further class consists of compounds of two of the metals of the class just mentioned with one or more elements of the B sub-group of the sixth group. Those so far investigated appear to be true compounds analogous to double salts rather than mere mixtures of binary compounds coming within the previous class. Substances found suitable are the sulphides and the tellurides of silver and thallium combined and of lead combined with silver, bismuth, tin or thallium. In some cases the combined sulphide and telluride of two such metals has been found suitable.

With any of the substances defined above the first condition can be fulfilled by suitably adjusting the electrical conditions, the pressure in which vaporization takes place, and the position of the carrier.

If the second condition is not fulfilled in the usual manner stated, that is, if the substance dissociates at the temperature required for vaporization, the metallic part of the compound may be evaporated and deposited on the carrier by one of the methods described above, very often giving a deposit with negative temperature coefficient. The metal deposit is then transformed into the compound in question by heating it in an evacuated glass tube and passing over it a stream of the other constituent together with a small amount of oxygen or air. Alternatively the second constituent can be sputtered on to the metal deposit while the latter is kept at a high temperature.

By the method of separate deposition of the constituents it has been found possible to produce highly sensitive cells of such compounds as silver sulphide, silver selenide, silver telluride, platinum telluride and gold telluride. Moreover, there are some cases in which the compound is not dissociated at the temperature in question where it is nevertheless advantageous to proceed by the method of separate deposition, because it yields a more sensitive cell.

It may happen that the third condition is not directly fulfilled by a substance it is desired to use, i. e. the specific resistance of the substance in bulk is too high. The conductivity of the base substance may often be increased by the addition of small quantities of another substance.

which may be an excess of one constituent of the base substance or a foreign substance, but care must be taken that the other conditions are fulfilled. Cadmium telluride is a substance of the kind mentioned. Two methods have been found suitable by which its conductivity in bulk could be increased to raise the photo-sensitivity. One is the addition of a small amount of silver telluride. The other is to drive off some of the tellurium by heating in a vacuum or in a hydrogen atmosphere, thus leaving excess cadmium.

The fourth condition is always fulfilled by substances with little pronounced metallic bond. It has been found, however, that the long wavelength threshold of sensitivity moves further into the infra-red with increasing predominance of the metallic properties of the substances. Accordingly a photocell sensitive far into the infra-red necessitates the use of a substance with pronounced metallic properties. If such a substance is treated direct by one or other of the methods already described there is a risk of the temperature coefficient of resistance becoming positive due to the metallic bond between the particles overcoming the force of adsorption between the particles and the barrier layer, the photo-sensitivity then being lost.

This drawback can be overcome by the addition of a small amount of a foreign substance which, in the deposition on the carrier of particles of the substance in the manner referred to above, is precipitated at the boundaries of the particles and strongly adsorbs oxygen. Thereby an effective barrier layer is produced, which ensures a sensitive cell.

Substances which are subject to the drawback mentioned when used in the pure state include some intermetallic compounds, such as platinum plumbide, gold bismuthide and platinum antimonide. The difficulty can be overcome by the addition of small amounts of aluminium, thallium or magnesium.

Certain substances were mentioned in the first paragraph of this specification as having already been used for photoconductive cells. These substances are included in those enumerated in connection with the present invention. There is, however, an important difference. Cells produced in the previously known manner from these substances had to ge kept in a vacuum. Cells produced by means of the invention from these same substances do not require such protection. Moreover, such cells are more sensitive than those produced by hitherto known means. In addition the invention greatly increases the range of substances from which photo-conductive cells can be made. A much wider selection of spectral sensitivities is thereby provided. For instance, the tellurides have a sensitivity extending far into the infra-red, and this property is found to be even more marked in the case of all compounds containing antimony.

Wherever in the specification and claims I have referred to the periodic series or charts and groups and sub-groups thereof I have reference to the international periodic table of elements, universally recognized.

While I have described my invention in certain preferred embodiments, I realize that modifications and changes may be made and I desire that it be understood that no limitations upon my invention are intended other than may be imposed by the scope of the appended claims.

What I claim is:

1. The method of producing a photo-conductive layer on a carrier to form a photocell in which a compound containing at least one metal selected from the group consisting of sulphides, selenides and tellurides and at least one other constituent selected from the group consisting of aluminum, thallium and magnesium is used for the sensitive layer and in which the metal is vaporized for deposition on to the carrier and while in the vapor phase is subjected to an electric discharge in the presence of oxygen, the said other constituent being subsequently vaporized for deposition on to the carrier.

2. The method of producing a photo-conductive layer on a carrier to form a photocell in which a compound selected from the group consisting of sulphides, selenides and tellurides and a substance containing at least one other metal is vaporized together with a small amount of a substance different from the said compound and from its constituents selected from the group consisting of aluminum, thallium and magnesium for deposition on to the carrier and while in the vapor phase is subjected to an electric discharge in the presence of oxygen.

3. The method of producing a photo-conductive layer on a carrier to form a photocell in which a compound having a strongly metallic bond selected from the group consisting of sulphides, selenides and tellurides is vaporized with a small amount of a substance different from the said compound and from its constituents selected from the group consisting of aluminum, thallium and magnesium on to the carrier and while in the vapor phase is subjected to an electric discharge in the presence of air.

4. The method of producing a photo-conductive layer on a carrier to form a photocell as set forth in claim 1 in which the vaporizing of the compound is effected by sputtering.

ERNST SCHWARZ.

References Cited in the file of this patent

UNITED STATES PATENTS

| Number | Name | Date |
|---|---|---|
| 1,765,413 | Fruth | June 24, 1930 |
| 2,066,611 | Christy | Jan. 5, 1937 |
| 2,103,623 | Kott | Dec. 28, 1937 |
| 2,153,363 | Bruche | Apr. 4, 1939 |
| 2,164,595 | Siebertz | July 4, 1939 |
| 2,189,580 | Hewlett | Feb. 6, 1940 |
| 2,239,642 | Burkhardt et al. | Apr. 22, 1941 |
| 2,420,722 | Peterson et al. | May 20, 1947 |